(12) United States Patent
Chen et al.

(10) Patent No.: US 9,584,569 B2
(45) Date of Patent: *Feb. 28, 2017

(54) METHOD AND SYSTEM FOR SUPPLYING MEDIA OVER COMMUNICATION NETWORKS

(71) Applicant: AT&T Intellectual Property II, L.P., Atlanta, GA (US)

(72) Inventors: Songqing Chen, Fairfax, VA (US); Lei Guo, Williamsburg, VA (US); Zhen Xiao, Randolph, NJ (US); Xiaodong Zhang, Williamsburg, VA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/071,942

(22) Filed: Mar. 16, 2016

(65) Prior Publication Data

US 2016/0197972 A1   Jul. 7, 2016

Related U.S. Application Data

(63) Continuation of application No. 13/888,231, filed on May 6, 2013, now Pat. No. 9,344,474, which is a
(Continued)

(51) Int. Cl.
| | |
|---|---|
| *G06F 15/16* | (2006.01) |
| *G06F 15/173* | (2006.01) |
| *G06F 9/44* | (2006.01) |
| *H04N 7/173* | (2011.01) |
| *H04L 29/06* | (2006.01) |

(Continued)

(52) U.S. Cl.
CPC .......... *H04L 65/4084* (2013.01); *H04L 29/00* (2013.01); *H04L 65/60* (2013.01); *H04L 65/601* (2013.01); *H04L 67/2842* (2013.01); *H04L 67/42* (2013.01); *H04N 21/00* (2013.01); *H04N 21/4722* (2013.01)

(58) Field of Classification Search
CPC ..... H04L 65/60; H04L 65/602; H04L 65/604; H04L 65/608; H04L 65/4084; H04L 65/4069; H04L 65/4092; H04L 29/00; H04L 29/06; H04L 29/06027; H04L 29/06476; H04L 67/288; H04L 67/2814; H04L 67/2823; H04L 67/2842; H04L 67/2852; H04N 21/218; H04N 21/23106; H04N 21/2402; H04N 21/2404; H04N 21/4331; H04N 21/4402; H04N 21/4722; H04N 21/6437; H04N 21/23418
USPC ....... 709/203, 217, 219, 223, 227, 232, 236; 717/168, 171–173; 725/116, 118–119
See application file for complete search history.

(56) References Cited

U.S. PATENT DOCUMENTS

| | | |
|---|---|---|
| 5,412,808 A | 5/1995 | Bauer |
| 5,933,603 A | 8/1999 | Vahalia et al. |

(Continued)

*Primary Examiner* — Farzana Huq

(57) ABSTRACT

Methods and systems for supplying media over communication networks are described. In one embodiment, a media supplier determines whether a media object hosted on a web server will be supplied to a client by streaming or not by streaming. Preferably, if the determination is to stream, the media supplier streams the media object to the client. In some cases, the same media supplier may be capable of supplying clients with media objects hosted on any of at least two web servers.

20 Claims, 3 Drawing Sheets

Related U.S. Application Data continuation of application No. 11/047,528, filed on Jan. 31, 2005, now Pat. No. 8,438,297.

(51) Int. Cl.
   *H04L 29/00* (2006.01)
   *H04N 21/00* (2011.01)
   *H04N 21/4722* (2011.01)
   *H04L 29/08* (2006.01)

(56) References Cited

U.S. PATENT DOCUMENTS

| | | | |
|---|---|---|---|
| 6,041,354 A | 3/2000 | Biliris et al. | |
| 6,138,147 A | 10/2000 | Weaver et al. | |
| 6,615,312 B1 * | 9/2003 | Hamlin | G06F 17/30017 707/E17.009 |
| 6,671,732 B1 | 12/2003 | Weiner | |
| 6,760,916 B2 | 7/2004 | Holtz et al. | |
| 6,859,840 B2 | 2/2005 | Singal et al. | |
| 6,886,029 B1 | 4/2005 | Pecus et al. | |
| 6,976,090 B2 | 12/2005 | Ben-Shaul et al. | |
| 7,054,423 B2 | 5/2006 | Nebiker et al. | |
| 7,124,125 B2 | 10/2006 | Cook et al. | |
| 7,647,418 B2 | 1/2010 | Ash et al. | |
| 2002/0103928 A1 * | 8/2002 | Singal | H04L 29/06 709/238 |
| 2002/0129373 A1 * | 9/2002 | Noda | H04L 29/06027 725/90 |
| 2002/0133247 A1 | 9/2002 | Smith et al. | |
| 2002/0143705 A1 | 10/2002 | Kaars | |
| 2003/0005116 A1 | 1/2003 | Chase et al. | |
| 2003/0099364 A1 | 5/2003 | Thompson et al. | |
| 2003/0105604 A1 * | 6/2003 | Ash | H04L 12/2602 702/100 |
| 2003/0195940 A1 | 10/2003 | Basu et al. | |
| 2003/0212804 A1 | 11/2003 | Hashemi | |
| 2004/0024898 A1 | 2/2004 | Wan | |
| 2004/0027898 A1 | 2/2004 | Takahashi et al. | |
| 2004/0030651 A1 | 2/2004 | Kim et al. | |
| 2004/0044785 A1 | 3/2004 | Bell et al. | |
| 2004/0078470 A1 | 4/2004 | Baumeister et al. | |
| 2004/0098463 A1 | 5/2004 | Shen et al. | |
| 2004/0117500 A1 | 6/2004 | Lindholm et al. | |
| 2004/0205093 A1 | 10/2004 | Li et al. | |
| 2005/0144165 A1 * | 6/2005 | Hafizullah | H04L 29/06 |
| 2005/0165941 A1 | 7/2005 | Eytchison et al. | |
| 2006/0168098 A1 | 7/2006 | Allard et al. | |
| 2008/0276304 A1 | 11/2008 | Maffione et al. | |

\* cited by examiner

METHOD AND SYSTEM FOR SUPPLYING MEDIA OVER COMMUNICATION NETWORKS

This application is a continuation of U.S. patent application Ser. No. 13/888,231, filed May 6, 2013, which is currently allowed and is a continuation of U.S. patent application Ser. No. 11/047,528, filed Jan. 31, 2005, now U.S. Pat. No. 8,438,297, all of which are incorporated herein by reference in their entirety.

FIELD OF THE INVENTION

The present invention relates generally to the distribution of media over a network and more particularly to the supplying of media over communication networks.

BACKGROUND OF THE INVENTION

This past decade has seen content distributed over communication networks, for example the Internet, evolving from mostly static text and images to increasingly more audio and video pages supported by multimedia objects. Three technical mechanisms are commonly used to deliver Internet media contents, namely downloading, pseudo streaming (also known as progressive downloading or Fast-Start), and streaming.

In downloading, a client receives the media content directly from a Web server, using HTTP ("Hypertext Transfer Protocol"). The entire media content is received before the client can start playing the media. There is therefore a long startup latency for large media objects or for clients who have limited bandwidths to the Internet such as dial-up clients. Moreover, if a client decides the content of a large media object is not interesting after playing only part of the object, most of the traffic in downloading has been wasted.

In pseudo streaming, the client also receives the media content directly from a Web (HTTP) server. However, the pseudo streaming technique provides the receiving client with the option to enable a media playing to play the media content that has already been received while the rest of the content is still being transmitted. Often, there is a rate mismatch between the rate of receiving the media content and the rate of playing the media content. The rate mismatch might result in user-perceived delays (if the playing rate is greater than the receiving rate), or in unnecessary traffic on the Internet (if the receiving rate is greater than the playing rate).

With streaming, the client receives media content form a special streaming server. The playing of a media object by the client media player can start shortly after the client receives the initial portion of the object from the streaming server, enhancing the playing experience. In addition due to the reduced user-perceived latency, the client can make a more timely decision to abort an uninteresting media object without consuming additional network bandwidth compared to downloading and pseudo streaming. Typically, streaming also provides clients with a variety of controls during playback such as pause, rewind and fast forward. Moreover, media content is generally not stored locally at the client, so content is better protected. Even with these advantages, streaming service today is not widely used for delivering media content (compared to downloading) due to the associated expenses and the limited availability of the necessary technology.

SUMMARY OF THE INVENTION

According to the present invention there is provided a method of supplying media to clients, comprising: receiving a request for a media object hosted on a web server; determining whether to stream at least part of the media object to a client or to have the media object supplied to the client not by streaming; if the determining is to stream, streaming at least part of the media object to the client; and if the determining is to have the media object supplied to the client not by streaming (that is, a non-streaming process, i.e. by non-streaming), allowing the web server to supply the media object not by streaming to the client.

According to the present invention there is also provided a system for supplying media to clients, comprising: means for determining whether to stream at least part of a media object hosted on a web server to a client or to allow the web server to supply the media object to the client not by streaming; and means for streaming the at least part of the media object to the client.

According to the present invention there is further provided a network for supplying media to clients, comprising: at least one web server adapted to host media objects; at least one client; and means for supplying media objects, the means including: means for determining whether to stream at least part of a media object hosted on at least one of the web servers to at least one of the clients or to allow the at least one hosting web server to supply the media object to the at least one of the clients not by streaming; and means for streaming the at least part of the media object to the at least one of the clients.

BRIEF DESCRIPTION OF THE DRAWING FIGURES

The invention is herein described, by way of example only, with reference to the accompanying drawings, wherein.

DETAILED DESCRIPTION OF THE INVENTION

Described herein are embodiments of the current invention including methods and systems for determining how to supply media to clients and for supplying the media accordingly.

The principles and operation of media supplying according to the present invention may be better understood with reference to the drawings and the accompanying description. All examples given below are non-limiting illustrations of the invention described and defined herein.

The term "client" is used interchangeably below, as appropriate, to refer to an inanimate thing such as a communication device, an element within a communication devices (software, hardware, firmware, etc.), a collection of communication devices, etc, and/or to refer to the user (individual, groups of individuals, etc) of the inanimate thing.

The term "media" as used below refers to any form and technology used to convey information, such as audio, image(s), text, video, etc.

The term "media object" as used below refers to media content which can be considered as a discrete whole. Media content includes but is not limited to audio, video, text and other media as known to the reader. It should be evident that differing amounts of the same media content may be considered a discrete whole, depending on the circumstances or on who is making the consideration. For example a video clip showing the highlights of a video may be considered a discrete whole and therefore a media object for the purposes of playing as an advertisement, whereas the entire video may be considered a discrete whole and therefore a media object for the purposes of playing as a feature presentation. As another example, a single song can be considered a discrete whole and therefore a media object, or the single song can be considered part of a song medley (where the song medley is considered the discrete whole and therefore the media object).

The term "duration-definable media object" as used below refers to a form and technology used to convey information where a time duration of the media object can be defined. Examples of duration definable media objects include audio objects—for example a song audio can be 3 minutes long, video objects—for example a video can be 90 minutes long, etc. It should be evident that in actual practice the playing duration of the media object by the client may be different than the defined duration, for example if the client needs to wait to receive additional parts of the media object, if the client fast-forwards parts of the media object, etc.

Figure 1:
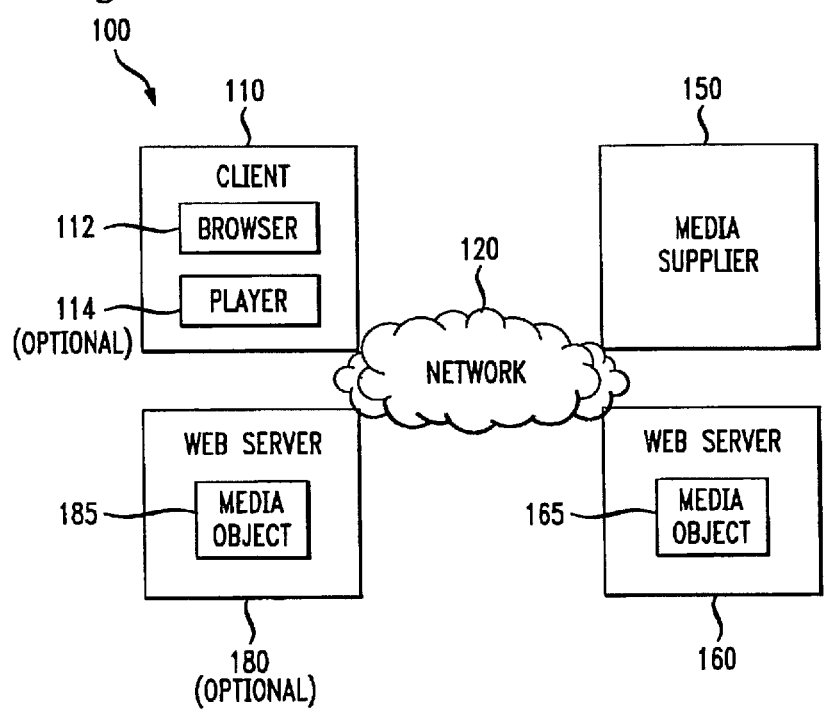
FIG. 1 is a block diagram of a system for supplying media, according to an embodiment of the present invention.

Referring now to the drawings, FIG. 1 illustrates a system 100 for supplying media, according to an embodiment of the invention. A client 110 connects to communication network 120 in order to request a media object 165 hosted on a web server 160.

System 100 also includes a media supplier 150 which handles the supplying of media object 165 hosted on web server 160. Alternatively, media supplier 150 may only handle the supplying of requested media object 165, if media object 165 is a duration definable media object (see further below for more details). Although the singular is used for hosting web server 160, it should be understood that if media object 165 is hosted on more than one web server 160, similar methods and systems to those described below can be used, mutatis mutandis.

Web server 160 in some embodiments, hosts one or more other media objects in addition to media object 165. In these embodiments, media supplier 150 may or may not handle the supplying of one or more of these other hosted media objects. For example, in one of these embodiments media supplier 150 may only handle the provision of other hosted media objects that are duration definable.

In some embodiments, system 100 also includes one or more optional additional web server(s) 180. In one embodiment, media supplier 150 also handles the supplying of one or more media object(s) 185, each hosted on one or more web server(s) 180. In this embodiment, the costs of installing, operating and maintaining media supplier 150 may be advantageously amortized over the plurality of web servers whose hosted media objects are handled by media supplier 150. For example, web server 160 and web server(s) 180 may in some cases constitute or be part of a server farm, where a server farm should be understood to mean a group of servers that are housed in one location.

Media supplier 150 may be located at any physical location and at any physical distance from web server 160. In one embodiment, media supplier 150 is located along a path between client 110 and web server 160. In another embodiment, media supplier 150 is housed in the same location as web server 160. For example, media supplier 150 may be part of the same server farm as web server 160 (and optionally web server(s) 180).

Web server 160 and optional web server(s) 180 can be any web server which uses the client/server model and HTTP to transmit to clients. Examples of commercially available web servers include inter-alia Apache (see for example www.apache.org) and Internet Information Server (produced by Microsoft Corporation Headquartered in Redmond, Wash.).

Communication network 120 can be any suitable combination of physical communication means and application protocol. Examples of physical means include, inter-alia: cable, optical (fiber), wireless (radio frequency), wireless (microwave), wireless (infra-red), twisted pair, coaxial, telephone wires, underwater acoustic waves, etc. Examples of application protocols include inter-alia Short Messaging Service Protocols, File Transfer Protocol (FTP), Telnet, Simple Mail Transfer Protocol (SMTP), Hyper Text Transport Protocol (HTTP), Simple Network Management Protocol (SNMP), Network News Transport Protocol (NNTP), Audio (MP3, WAV, AIFF, Analog), Video (MPEG, AVI, Quicktime, RM), Fax (Class 1, Class 2, Class 2.0), and tele/video conferencing. In some embodiments, communication network 120 can alternatively or in addition to be identified by the middle layers, with examples including inter-alia the data link layer (modem, RS232, Ethernet, PPP point to point protocol, serial line internet protocol-SLIP, etc), network layer (Internet Protocol-IP, User Datagram Protocol-UDP, address resolution protocol-ARP, telephone number, caller ID, etc.), transport layer (TCP, Smalltalk, etc), session layer (sockets, Secure Sockets Layer-SSL, etc), and/or presentation layer (floating points, bits, integers, HTML, XML, etc). For example the term "Internet" is often used to refer to a TCP/IP network. In some embodiments, communication network 120 includes one technology whereas in other embodiments communication network 120 includes a combination of technologies. For example cellular telephone operators may provide a gateway, for example a Wireless Application Protocol ("WAP") gateway, between the cellular telephone network and the Internet. As another example, access from the Internet to a cellular telephone network can be provided through a push proxy server.

In some embodiments, the same combination of physical communication means and application protocol constitute communication network 120 used for communication between all of client 110, media supplier 150, and web server 160 (and optional web server(s) 180). In other embodiments, different combinations of physical communication means and application protocols may constitute communication networks 120 used for communication between any two of client 110, media supplier 150, web server 160 and optional web server(s) 180. For example in one embodiment, client 110 may communicate with web server 160 (directly and/or via media supplier 150) using HTTP while media supplier 150 communicates with web server 160 using another protocol, for example a proprietary protocol, whereas in another embodiment both the communication between client 110 and web server 160 (direct and/or via media supplier 150) as well as the communication between media supplier 150 and web server 160 use HTTP.

Client 110 can be of any type suitable for communication via communication network 120, including inter-alia wireless devices (cellular phones, pagers, etc.), Public Switched Telephone Network (PSTN) devices (fax machines, telephones, etc.), computers, Personal Digital Assistants (FDA's) etc, as appropriate to the applicable communication network 120.

Preferably client 110 includes a web browser 112 for requesting media object 165 hosted on web server 160. Web browser 112 can communicate with media supplier 150 and/or web server 160 using for example HTTP. Examples of available web browsers which can be used as web browser 112 include Netscape Navigator and Microsoft's Internet Explorer. Web browsers are well known in the art and therefore no further elaboration on operation of web browsers will be provided.

Client 110 optionally also includes a media player 114 which is capable of being configured to play media object 165, provided media object 165 is a duration definable media object. Media player 114 typically can be configured to play duration definable media objects received by streaming and/or pseudo streaming. Examples of commercially available media players include inter-alia Microsoft's Windows™ Media Player, Real Player™ (produced by RealNetworks, Inc headquartered in Seattle Wash.), and QuickTime™ Player (produced by Apple Computer, Inc. headquartered in Cupertino, Calif.).

In some embodiments other components may be included in system 100, for example additional clients, additional servers, etc.

Figure 2:
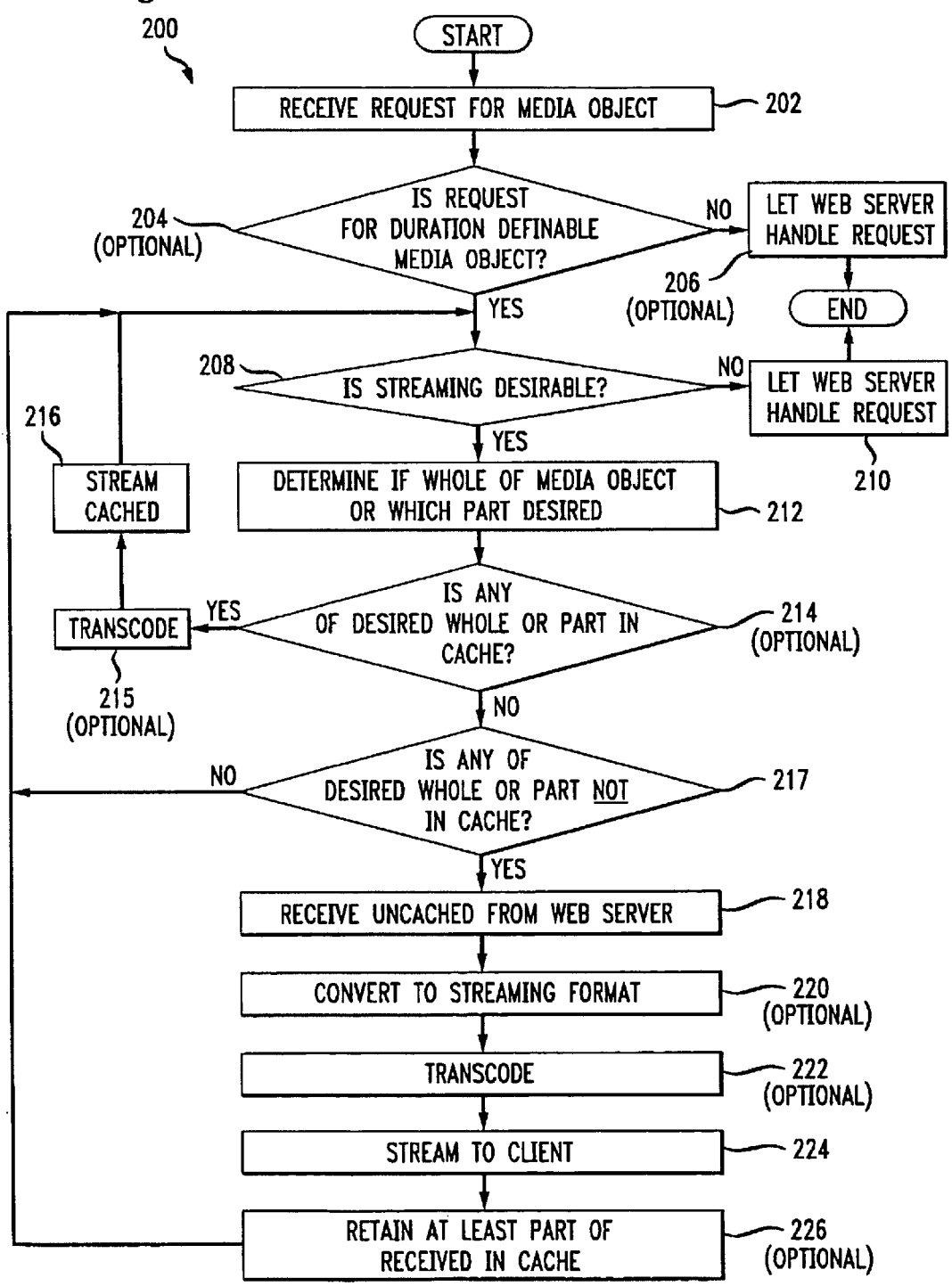
FIG. 2 is a flowchart of a method for supplying media, according to an embodiment of the present invention.

FIG. 2 illustrates a flowchart of a method 200 for supplying media, according to an embodiment of the present invention. The flowchart of FIG. 2 uses the example of media object 165 hosted on web server 160. However, it should be evident that method 200 can be used for other media objects hosted on web server(s) 160 and/or 180, mutatis mutandis.

The invention is not bound by the specific stages or order of the stages illustrated and discussed with reference to FIG. 2. It should also be noted that alternative embodiments can include only selected stages from the illustrated embodiment of FIG. 2 and/or additional stages not illustrated in FIG. 2.

Figure 3:
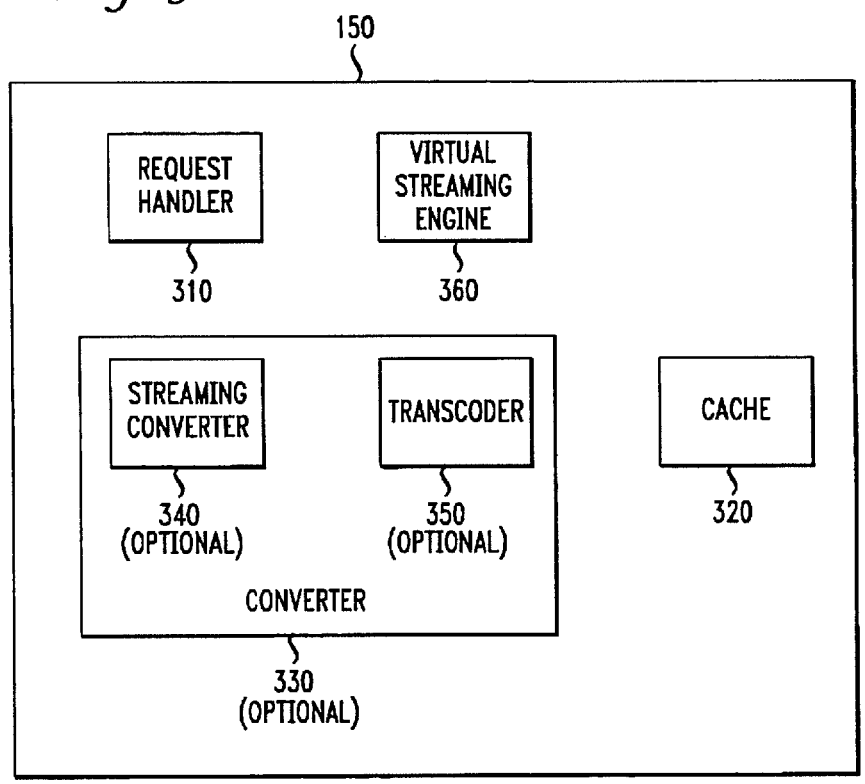
FIG. 3 is a block diagram of a media supplier, according to an embodiment of the present invention.

FIG. 3 illustrates a block diagram of media supplier 150 for executing method 200, according to an embodiment of the present invention. Media supplier 150 can be made up of any combination of software, hardware and/or firmware that performs the functions as defined and explained herein. Modules shown in FIG. 3 as being part of media supplier 150 include: a request handler 310, a cache 320, an optional converter 330, and a virtual streaming engine 360. Converter 330 is shown in FIG. 3 as including two modules: an optional streaming converter 340 and an optional transcoder 350. Each of request handler 310, cache 320, converter 330, streaming converter 340, transcoder 350, and streaming engine 360 can be made up of any combination of software, hardware and/or firmware that performs the functions as defined and explained herein.

The division of media supplier 150 into the modules shown in FIG. 3 is for ease of understanding and in other embodiments any illustrated module may be separated into a plurality of modules or alternatively combined with other modules. The modules of media supplier 150 may be centralized or the modules may be distributed over more than one physical unit and/or physical location.

The division of converter 330 into the two modules shown in FIG. 3 is for ease of understanding and in other embodiments each of the two modules may be separated into a plurality of modules or alternatively combined with the other module.

In stage 202 of method 200 (FIG. 2) request handler 310 receives a client request for media object 165 hosted on web server 160. In one embodiment, request handler 310 intercepts any request for media object 165 directed by client 110 to web server 160. In another embodiment, web server 160 forwards any client request for media object 165 to request handler 310, or alternatively only forwards a client request for media object 165 to request handler 310 if media object 165 is duration-definable. In embodiments where request handler 310 receives all client requests for media object 165 (either directly or indirectly), request handler 310 determines if requested media object 165 is duration-definable or not (optional stage 204). For example, for a URL request, request handler 310 can examine the file name suffix. Some examples of suffixes connoting (duration definable) audio objects include inter-alia: mp3, wav, ra, ram, wma, and au. Some examples of suffixes connoting (duration definable) video objects include inter-alia: mpeg, mpg, mp, mpeg2, mp4, asf, svt, wmv, wm, qt, mov, rm, rmvb, and avi. As another example, request handler 310 can alternatively or additionally examine the request header, for example if the user-agent field corresponds to a media player, the requested media object 165 is typically duration-definable These means and others for request handler 310 to identify whether the requested media object 165 is duration-definable or not are well known in the art and will therefore not be further expanded upon here.

If the request is not for a duration definable media object, request handler 310 allows web server 160 to handle the request (optional stage 206) and method 200 for media supplier 150 ends.

If the request is for a duration definable media object, then method 200 continues with stage 208. In embodiments where request handler 310 only receives requests for duration-definable media objects, stage 204 is omitted and method 200 proceeds directly to stage 208.

In stage 208, request handler 310 determines if media object 165 should be supplied to client 110 by streaming or not by streaming (for example by downloading). In one embodiment, request handler 310 provides choices to client 110 whether to receive media object 165 by streaming or not by streaming and receives a selection from client 110. In another embodiment, request handler 310 receives a selection from client 110 (without first providing choices to client 110). For example the client selection of streaming or not streaming can be included in the initial client request received in stage 202. In another embodiment, request handler 310 determines whether to stream media object 165 or not based at least partly on parameters of system 100. The determination based on parameters of system 100 can be in addition to or instead of a determination based on express client selection. For example, if client 110 does not include a properly configured player 114, then request handler 310 would determine that streaming is not desirable and that media object 165 should not be supplied by streaming to client 110. Request handler 310 can determine that client 110 includes a properly configured player 114, for example if user-agent field of the request header corresponds to a media player.

If streaming is not desirable, request handler 310 allows web server 160 to handle the request (stage 210) and method 200 for media supplier 150 ends.

In one embodiment, request handler 310 in stage 206 and/or 210, informs web server 160 that web server 160 should handle the client request by forwarding the request to web server 160. In another embodiment, request handler 310 communicates to web server 160 to handle the request without forwarding the exact client request. This communication can be in any protocol, for example HTTP or a proprietary protocol. In stages 206 and/or 210, web server 160 provides requested media object 165 to client 110 by any known technique, for example by downloading. These techniques are well known in the art and therefore will not be expanded upon further here.

If streaming is desirable, method 200 continues with stage 212, with request handler 310 determining what from media object 165 should be streamed. For example request handler 310 can determine if the whole of media object 165 is desired or if less than the entire media object 165 is desired, and if less than the whole is desired, request handler 310 can determine which part of media object 165 is desired. The way of determining may vary depending on the embodiment. In one embodiment the initial client request (received in stage 202) specifies if client 110 wants to initially play the entire media object 165 or to preview a part of media object 165, for example the beginning part of media object 165. In another embodiment, after receiving the initial request in stage 202, request handler 310 provides choices to client 110 on whether client 110 wants to play the entire media object 165 or preview a part of media object 165. In this other embodiment request handler 310 then receives a selection from client 110. If only a part of media object 165 is to be played, in some embodiments client 110 specifies (for example in the initial client request or as a later selection) which part of media object 165 to play and in some other embodiments client 110 only specifies that a preview of part of media object 165 is desired and request handler 310 chooses which part of media object 165 to supply for previewing. For example, in one of these other embodiments, request handler 310 always chooses to supply for preview the beginning of media object 165, e.g. a fixed amount at the beginning of the media object, a fixed percentage of the media object starting from the beginning of the media object, etc. In another of these embodiments, request handler 310 always chooses to supply for preview any part of media object 165 in cache 320.

In some embodiments, cache 320 stores media objects which have been previously requested or parts thereof. In these embodiments, request handler 310 determines in optional stage 214 if cache 320 contains any portion of the desired whole or part of media object 165. If any portion of the desired whole or part of media object 165 is in cache 320, then in stage 215 the cached whole or part is transcoded by transcoder 350. Then, in stage 216 virtual streaming engine 360 streams the cached whole or part to client 110.

In the illustrated embodiment of FIG. 2 it is assumed that cache 320 stores media objects or parts thereof in a streaming format but that results of previous transcoding are not stored. It is also assumed that transcoding is required. Therefore transcoding takes place in stage 215 prior to streaming in stage 216. In other embodiments, cache 320 stores results of previous transcoding and therefore in cases where the necessary transcoding is the same as the stored results for media object 165, stage 215 may be omitted. The transcoding in stage 215 may also be omitted if media object 165 has been authored for or already adapted to client 110 or to sufficiently similar clients. Stage 215 can also be omitted in some instances if client 110 has sufficient network bandwidth so that transcoding is unnecessary, for example in some cases when client 110 has a high speed Internet connection.

In other embodiments, cache 320 stores media objects or parts thereof which are not in a streaming format, and in these embodiments the cached whole or part of media object 165 is converted to a streaming format by streaming converter 340 (stage not shown) and optionally transcoded prior to being streamed in stage 216 to client 110.

Once streaming of the cached portion in stage 216 is completed or upon earlier client termination, the cached portion may be retained in cache 320 or may be discarded, depending upon the embodiment.

If any portion of the desired whole or part of media object 165 is not in cache 320 (stage 217), request handler 310 requests the uncached portion from web server 160 in stage 218. For example assuming cache 320 only contains the beginning part of media object 165 and client 110 wishes to play the entire media object 165, request handler 310 can requests the remainder of media object 165 from web server 160.

As mentioned above request handler 310 can communicate with web server 160 using any protocol or no protocol. For example, request handler 310 may communicate in stage 218 using HTTP, a proprietary protocol, etc. In one embodiment where a portion of the desired whole or part of media object 165 is in cache 320 and another portion of the desired whole or part of media object 165 is not in cache 320 but needs to be requested from web server 160, request handler 310 can send a range request for the uncached portion to web server 160.

In embodiments where a portion of the desired whole or part of media object 165 is cached and another portion of the desired whole or part of media object 165 is uncached, stages 215 to 216 may or may not occur in parallel with stages 218 to 226. For example if client 110 wishes to receive media object 165, for example an entire video, but only the beginning portion of the video is in cache 320, streaming engine 360 may begin streaming the beginning cached portion (stage 216), while in parallel request handler 310 requests the uncached portion from web server 160 (stage 218). As another example, again assuming that only the beginning portion of a desired video is cached, streaming engine 360 may try to limit the delay between streaming the cached portion (stage 216) and streaming the uncached portion (stage 224) and therefore wait until the uncached portion of the video is received and at least partly processed before streaming the cached portion.

In embodiments where cache 320 is not configured for storing media objects which have been previously requested or parts thereof, request handler 310 skips stage 214 to 217 and proceeds directly to stage 218, requesting the desired (uncached) whole or part of media object 165 from web server 160.

In a continuation of stage 218, the requested portion of the desired whole or part of media object 165 is received from web server 165 into cache 320.

In optional stage 220, if the portion of media object 165 received in stage 218 is in a non-streaming format (for example MPEG1 files), streaming converter 340 converts the received portion to a streaming format (see below for examples of streaming formats).

Examples of commercially available streaming converters which can be used as streaming converter 340 in stage 220 include inter-alia: Adobe Premiere (produced by Adobe Systems Inc. headquartered in San Jose, Calif.) and Real-Network's Helix DNA Producer. (In an embodiment where the cached portion of media object 165 is not in a streaming format, these examples of streaming converters can also be used to convert the cached portion to a streaming format-see above with reference to stage 216).

If the portion of media object 165 received in stage 218 is in a streaming format, for example because conversion to a streaming format has taken place elsewhere or because media object 165 is in a streaming format, then stage 220 can be skipped.

In optional stage 222, transcoder 350 adapts the streamable portion to client 110 and the connection speed. (Because diverse client devices may request media object 165, in some cases rather than author media object 165 separately for each individual client device, a uniform media object 165 is authored and therefore later adaptation to the requesting client device may be necessary).

Examples of transcoding systems which can be used as transcoder 350 in stage 222 and/or in stage 215 are described in "Adapting Multimedia Internet Content for Universal Access" by Rakesh Mohan, John R Smith, and Chung-Sheng Li, IEEE Transactions on Multimedia, Vol I, No. I, March 1999 and in US Patent Application 2004/0098463 to Shen et al; details of each are separately incorporated by reference.

Stage 222 can be skipped if media object 165 has been authored for or already adapted to client 110 or to sufficiently similar clients. Stage 222 can also be omitted in some instances if client 110 has sufficient network bandwidth so that transcoding is unnecessary, for example in some cases when client 110 has a high speed Internet connection.

In stage 224, the portion of media object 165 which was received from web server 160 and has optionally been converted in converter 330 (i.e. optionally converted to a streaming format and/or transcoded) is streamed to client 110 by streaming engine 360.

In one embodiment, virtual streaming engine 360 used in stage 224 and/or stage 216 includes the functionality of one or more commercially available streaming engines including inter-alia Microsoft's Windows Media Streaming Engine, RealNetwork's Real Media Streaming Engine, Apple's QuickTime Media Streaming Engine, etc.

One or more of the following streaming formats may be used by virtual streaming engine 360 to stream to client 110 in stage 224 and/or stage 216 Microsoft's Windows Media, RealNetwork's RealMedia, Apple's QuickTime, ISO-standard MPEG-4, or any other suitable streaming format. As streaming formats are well known in the art, no further elaboration is provided.

The communication between client 110 and virtual streaming engine 360 in stage 224 and/or stage 216 may be based on any suitable streaming protocol, for example Microsoft Media Server Protocol MMS, real time streaming protocol RTSP, etc. As methods to initiate and continue communication between clients and streaming engines/servers are well known in the art, no further elaboration is provided.

In optional stage 226, at least part of media object 165 which was received into cache 320 in stage 218 is retained in cache 320, even after streaming to client 110 is completed. Depending on the embodiment the at least part of media object 165 retained in cache 320 may or may not be in a streaming format and/or may or may not include the results of the transcoding.

In one embodiment, cache 320 is a prefix cache and therefore the prefix of media object 165 is retained in the cache in stage 226 (assuming received in stage 218). Examples of prefix caches which can be used as cache 320 are described in the co-pending U.S. patent application Ser. No. 09/350,076 "Proxy prefix caching for multimedia streams" to Rexford et al filed on Jul. 8, 1999, the entirety of which is incorporated by reference.

In other embodiments, in stage 226 other parts of media object 165 may be retained in cache 320 in addition to or instead of the prefixes. For example, in one of these embodiments all of the desired whole or part may be retained in stage 226 (assuming received in stage 218). As another example, cache 320 can include segments selected dynamically based on client accesses, as described in co-pending U.S. patent application Ser. No. 11/047,305, "Caching Method And System For Providing Interactive Streaming" to Chen et al, details of which are incorporated by reference.

If no part of media object 165 needs to be retained in cache 320, for example because any parts suitable for caching were already cached and did not need to be received in stage 218, or for example because cache 320 is not configured to retain media objects once streaming has been completed, then stage 226 can be skipped.

In one embodiment, any part of media object 165 which was received into cache 320 in stage 218 but not retained in cache 320 in stage 226 is discarded from cache 320 once streaming has been completed in stage 224 (or upon earlier client termination).

In the illustrated embodiment, once the desired whole or part of media object 165 has been streamed to client 110, method 200 loops back for another iteration to stage 208 with request handler 310 determining if media object 165 should be supplied to client 110 by streaming or not by streaming (see above description of stage 208 and following stages). For example, assuming that in a previous iteration client 110 received a preview of part of media object 165, on a subsequent iteration client 110 may choose to have media object 165 downloaded, or to preview the same part of media object 165, or to preview a different part of media object 165, or to have streamed the entire media object 165, or to have streamed the remainder (i.e. non-previewed part) of media object 165, etc. The number of times that method 200 loops back to stage 208 may vary from 0 times to an infinite number of times depending on the embodiment. For example, in one embodiment the number of iterations for particular media object 165 may be limited by media supplier 150 to a pre-defined number of times if there is a large number of clients requesting media objects.

In one embodiment, at any time during method 200, media supplier 150 may terminate method 200, for example upon receiving a termination request from client 110. In addition, in this embodiment at any time during the streaming (stage 216 and/or 224), client 110 can perform any type of interactive operation with streaming engine 360, for example stop, jump, fast forward, rewind, play, etc. These interactive operations are standard to the art and will therefore not be further elaborated upon here.

While the invention has been described with respect to a limited number of embodiments, it will be appreciated that it is not thus limited and that many variations, modifications, improvements and other applications of the invention will now be apparent to the reader.

What is claimed is:

1. A method of supplying a media object, the method comprising:
   receiving, by a hardware media supplier, a first request from a client for the media object hosted on a web server, wherein the hardware media supplier is distinct from the web server;
   determining, by the hardware media supplier, to stream the media object to the client, wherein the determining to stream comprises ascertaining the media object based upon a file name suffix of a format defined in a request header for the media object;
   determining, by the hardware media supplier, a part of the media object to stream to the client;
   converting the part of the media object from a non-streaming format into a streaming file format; and
   streaming the part of the media object to the client to meet a network connection speed of the client, wherein the hardware media supplier received the media object from the web server prior to streaming the part of the media object to the client.

2. The method of claim 1, wherein the request is intercepted by a request handler of the hardware media supplier.

3. The method of claim 1, wherein the receiving of the media object from the web server comprises:
   transmitting a second request for the media object to the web server; and
   receiving the media object that is requested from the web server.

4. The method of claim 1, wherein the determining the part of the media object to stream, includes:
   receiving a selection of the part of the media object from the client.

5. The method of claim 1, wherein the streaming of the part of the media object is of less than all of the media object, further comprising:
   receiving a selection from the client on whether to stream a remainder of the media object.

6. The method of claim 1, further comprising:
   retaining the media object that is streamed to the client in a cache after the media object is streamed to the client.

7. The method of claim 1, further comprising:
   adapting at least the part of the media object to meet a plurality of parameters of the client.

8. The method of claim 6, wherein the media object that is retained comprises a prefix of the media object.

9. The method of claim 7, wherein the plurality of parameters comprises the network connection speed of the client.

10. A system, comprising:
    a request handler in a media supplier, embodied in hardware, for determining to stream a media object hosted on a web server to a client, wherein the media supplier is distinct from the web server, wherein the determining to stream comprises ascertaining the media object based upon a file name suffix of a format defined in a request header for the media object and determining a part of the media object to stream to the client, wherein the media supplier received the media object from the web server prior to streaming the part of the media object to the client;
    a streaming converter in the media supplier for converting a non-streaming format for the part of the media object to a streaming file format; and
    a streaming engine in the media supplier for streaming the part of the media object to the client to meet a network connection speed of the client.

11. The system of claim 10, wherein the request handler is for adapting at least the part of the media object to meet a plurality of parameters of the client.

12. The system of claim 10, further comprising:
    a cache in the media supplier for caching at least the part of the media object.

13. The system of claim 12, wherein the part of the media object that is retained comprises a prefix of the media object.

14. The system of claim 12, wherein the part of the media object that is retained comprises an entirety of the media object.

15. A system, comprising:
    a web server for hosting a media object; and
    a hardware media supplier, wherein the hardware media supplier is distinct from the web server, the hardware media supplier comprising:
       a request handler for determining to stream the media object hosted on the web server to a client and determining a part of the media object to stream to the client, wherein the determining to stream comprises ascertaining the media object based upon a file name suffix of a format defined in a request header for the media object, wherein the hardware media supplier received the media object from the web server prior to streaming the part of the media object to the client;
       a streaming converter for converting a non-streaming format for the part of the media object to a streaming file format; and
       a streaming engine for streaming the part of the media object to the client to meet a network connection speed of the client.

16. The system of claim 15, wherein the hardware media supplier and the web server communicate using a hypertext transfer protocol.

17. The system of claim 15, wherein the web server includes at least two web servers.

18. The system of claim 15, wherein the determining the part of the media object to stream, comprises receiving a selection of the part of the media object from the client.

19. The system of claim 15, further comprising:
    a cache in the hardware media supplier for caching at least the part of the media object.

20. The system of claim 11, wherein the plurality of parameters comprises the network connection speed of the client.

* * * * *